United States Patent [19]
Gumbert

[11] 3,721,878
[45] March 20, 1973

[54] WINDSHIELD WIPER ARRANGEMENT
[75] Inventor: Paul Gumbert, Buhlertal, Germany
[73] Assignee: Robert Bosch G.m.b.H., Stuttgart, Germany
[22] Filed: June 15, 1972
[21] Appl. No.: 262,975

[30] Foreign Application Priority Data
June 26, 1971 Germany..................P 21 31 900.6

[52] U.S. Cl.................318/443, 318/41, 318/DIG. 2
[51] Int. Cl................................................B60s 1/08
[58] Field of Search...........318/41, 45, 443, DIG. 2

[56] References Cited
UNITED STATES PATENTS

| | | | |
|---|---|---|---|
| 2,319,408 | 5/1943 | Korte et al. | 318/DIG. 2 |
| 2,732,523 | 1/1956 | Schnepf | 318/DIG. 2 |
| 3,115,598 | 12/1963 | Ziegler | 318/DIG. 2 |
| 3,231,803 | 1/1966 | Pryor et al. | 318/45 |

Primary Examiner—Benjamin Dobeck
Attorney—Michael S. Striker

[57] ABSTRACT

A first and second wiper are each pivotable between a starting position and a direction-reversing position. A first and a second motor each drive the respective wipers and are connected with one pole of the source of electrical energy. A first and second circuit connect said first motor with the other pole of said source, and a third and normally open fourth circuit connect said second motor with the other pole of said source. A first control switch assembly is interposed in said first and third circuit and is responsive to displacement of said first wiper to make and break said first and third circuit while the said first wiper is in and out of its starting position. An operator-controlled switch is interposed in said second circuit to make and break the latter at the will of an operator. A second control switch assembly is interposed in said fourth circuit and controlled by said first wiper so as to make said fourth circuit while said first wiper is in its direction-reversing position thereof.

5 Claims, 3 Drawing Figures

WINDSHIELD WIPER ARRANGEMENT

BACKGROUND OF THE INVENTION

The present invention relates generally to a windshield wiper arrangement, and more particularly to a windshield wiper arrangement which is particularly suitable for use in motor vehicles.

Windshield wiper arrangements are already known in which two windshield wipers are mounted transversely spaced from one another, having freedom of pivotable movement from a starting position in which they extend away from one another to a direction-reversing position in which they are closer to one another. When an arrangement of this type is started up, the windshield wipers pivot over the windshield toward one another, and their wiper fields overlap in the middle. Evidently it is necessary to prevent the wipers from contacting and interfering with one another in the region of such overlap.

One proposal known from the prior art provides a single drive motor for both wipers, being operatively connected with the wipers via an orbiting crank, push rods and rockers. A releasable coupling is interposed between the push rods and the rocker arms of one of the wipers, namely that one which starts up with a time delay relative to the other wiper. The coupling has a latching pawl which is moved out of its latching position by an electro magnet when, after the system has been switched off and subsequently the delayed-starting wiper has moved from its rest position so that the other wiper — the one which started up earlier originally — will now move by itself from its direction-reversing position to its own starting position. When the system subsequently is switched on again, the pawl automatically moves to its resting position when the first wiper has moved out of its starting position and has reached its direction-reversing position. Now, the second wiper begins to move with the desired time delay.

Although this prior-art construction is operative for its intended purpose, it is nevertheless relatively complicated and requires a series of components which must cooperate rater precisely with one another, as well as being installed with the necessary precision, in order to assure reliable coupling and uncoupling of the delayed-starting wiper with the drive.

Another proposal utilizes a single drive motor as in the previously mentioned construction. Here, however, the disengagable coupling is provided in the drive of one of the wipers between moving components of the motor drive which must be displaced axially with reference to one another in order to effect coupling or uncoupling. This type of coupling requires a relatively significant amount of force, at least for uncoupling or disengagement, because the coupling components are retained in tensioned engagement due to the torque which is transmitted to them and can be axially moved apart only when the frictional forces acting upon them have been overcome.

The drawback of this particular prior-art construction is that it is complicated and expensive, and that it is substantially different from the conventional wiper arrangement drives which are produced in very large series and do not use disengagable couplings.

SUMMARY OF THE INVENTION

It is, therefore, a general object of the present invention to overcome the disadvantages of the prior art.

More particularly, it is an object of the present invention to provide an improved windshield wiper arrangement which can be used with particular advantage — although not exclusively — in motor vehicles, and which arrangement does not have the disadvantages of the prior art with respect particularly to complexity, expense and other aspects.

A further object of the invention is to provide a windshield wiper arrangement of the type under discussion in which the starting of one of the wipers is delayed with reference to that of the other wiper when the system is placed in operation, but without requiring a mechanical coupling in the drive.

Another object of the invention is to provide such a windshield wiper arrangement which is rather simple in its construction and assures that the operation of the two wipers in synchronous, that is that both wipers will reach the locations at which they reverse their direction of pivotal displacement, at one and the same time. This requirement is to be met particularly in wiper arrangements where the wipers can be operated at two different speeds, that is at a slow speed and at a higher speed, and in which it is particularly important that the above requirements are met exactly, and that the drive motors can be braked rapidly.

In pursuance of these objects, and of others which will become apparent, one feature of the invention resides in a windshield wiper arrangement, particularly for motor vehicles, which briefly stated comprises first and second wiper means mounted for pivotable displacement between a respective starting position and a direction-reversing position. A source of electrical energy is provided and a first and a second motor are each connected with one pole of this source. First and second circuit means connect the first motor with the other pole of said source. A third and normally open fourth circuit means connect the second motor also with the other pole of said source. First control switch means is interposed in the first and third circuit means and responsive to pivotal displacement of the first wiper means for making and breaking the first and third circuit means while the first wiper means is respectfully out of and in its starting position. An operator-controlled switch is interposed in the second circuit means for making and breaking the latter at the will of an operator. Finally, a second control switch means is interposed in the fourth circuit means and associated with the first wiper means, being responsive to pivotal displacement of the same and operative for making the fourth circuit means while the first wiper means is in its direction-reversing position.

With this construction, the second motor is energized with a time-delay relative to the energization of the first motor, and its supply of electrical energy is afforded temporarily when the first wiper operated by the first motor moves through its direction-reversing position, that is the position which is the other end position with respect to the starting position of the first wiper.

The arrangement according to the present invention assures that essentially only electrical control means are required to obtain the desired control sequence for the wipers, electrical control means being readily accomodatable in the housings of the motors and being thus protected against damage or deleterious influences. Moreover, the operations and timing of such electrical control means can be adjusted relatively simply and with great precision. The second control switch means energizes the second motor with such a time delay relative to the energization of the first motor, that the desired synchronous movement of the first and second wipers is obtained, thus making it unnecessary to provide magnetic or other mechanical means for effecting the coupling and uncoupling of the wiper with the drive, as was necessary in the prior art. Moreover, the second control switch means assures in a simple manner that the second motor will be temporarily stopped in that position corresponding to the starting position of the second wiper, if the second motor should operate faster than the first motor and if the second wiper should therefore reach its starting position more quickly than the first wiper.

According to a further concept of the invention, in which the advantages of the present invention are particularly pronounced, an interruptor switch may be incorporated in the second circuit means of the first motor in series with the operator-controlled switch, the purpose of the interruptor switch being to interrupt the second circuit means of the first motor temporarily before the second wiper reaches the direction-reversing position thereof. The interruptor switch must for this purpose, of course, be controlled by and responsive to the movement of the second wiper. This embodiment provides a full synchronization of the movements of the two wipers without any significant increases in the complexity and costliness of the basic wiper arrangement according to the present invention. The first wiper is briefly stopped in its starting position if the second wiper should move to slowly, that is if the second wiper should not yet have reached its own starting position by the time the first wiper has moved to its starting position.

The invention also proposes, particularly in windshield wiper arrangements which are to operate at high wiping speeds, to construct the first control switch means with transfer switches which alternately connect the first motor with the first and second circuit means and the second motor with the third and fourth circuit means, in the desired rhythm. The second control switch means and the interruptor switch should then also be constructed as transfer switches each having a transfer contact respectively associated with one of the transfer switches of the first control switch means and another contact which is connected with the second pole of the source of electrical current, that is the one with which the first-through-fourth circuit means are connected.

Such an arrangement assures in a simple manner that a breaking current circuit is prepared for the motors, if the motors upon switching-off of the arrangement or in the event that one motor returns to a position corresponding to the starting position of its associated wiper faster than the other, acting upon the transfer switch which controls their respective current supply.

A simple electrical circuit or wiring arrangement is obtained in wiper systems or arrangements utilizing two motors and a step switch which permits the operation at two or more differential wiping speeds, if the step switch is associated with both motors and is interposed in the first and third circuits between the motors and the transfer switches accomodated in these circuits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
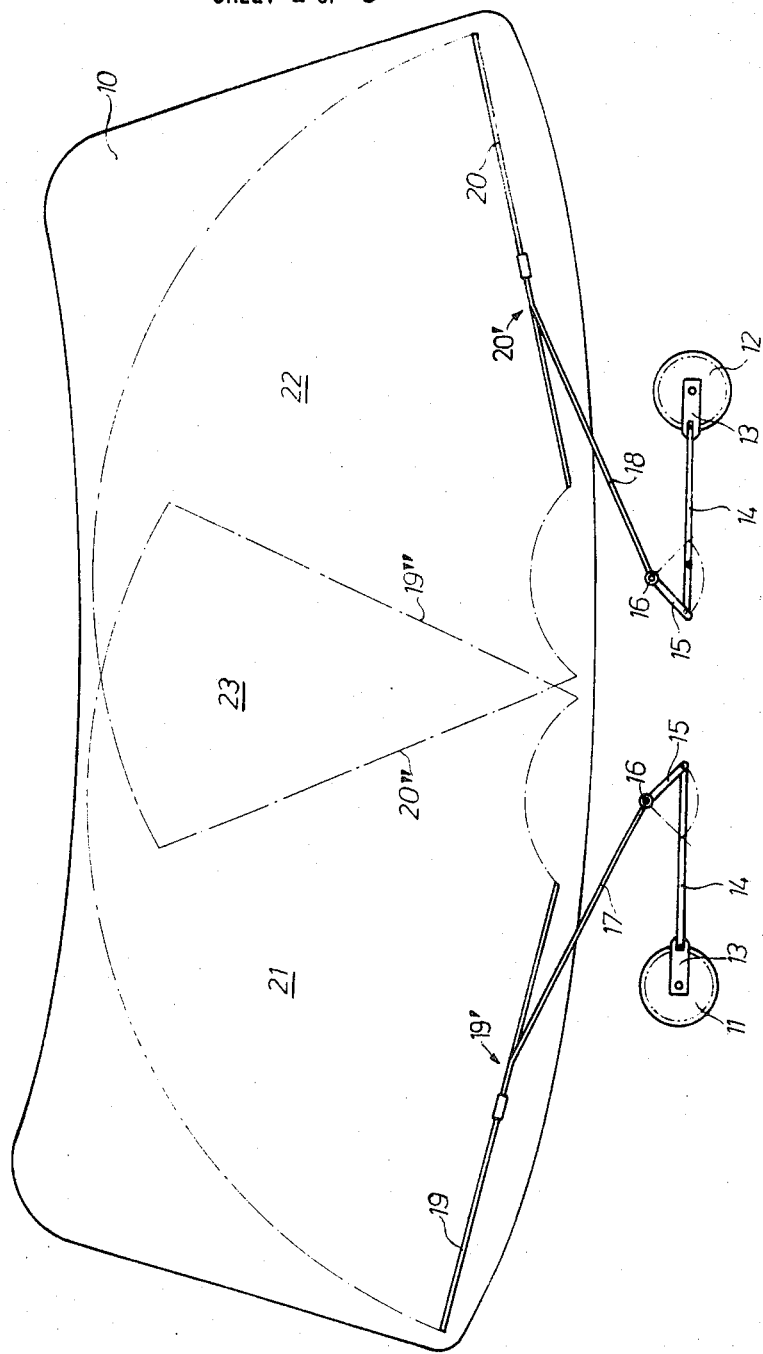
FIG. 1 is a diagramatic view illustrating an arrangement according to the present invention.
Figure 2:
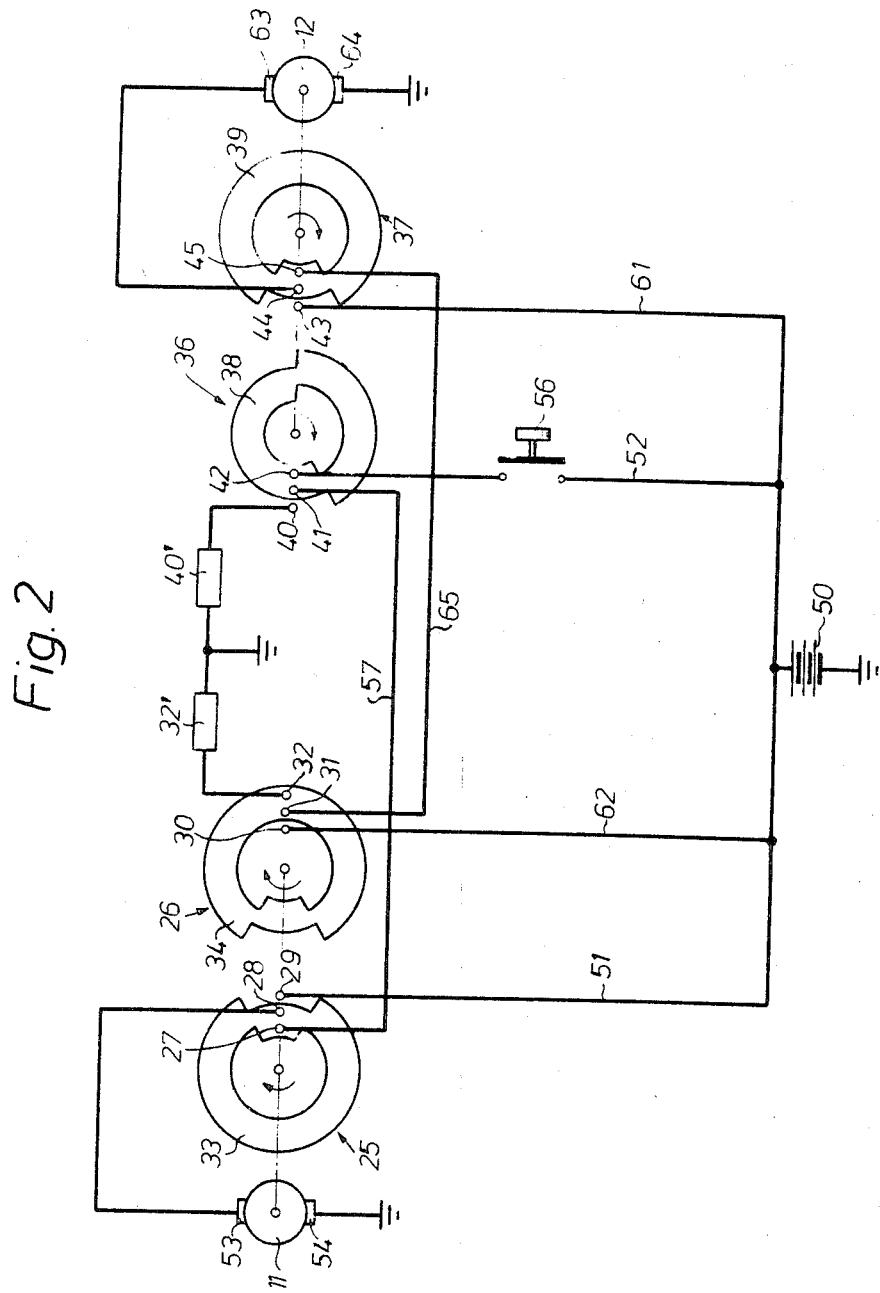
FIG. 2 is a detailed view illustrating the electrical circuit for the embodiment in FIG. 1.
Figure 3:
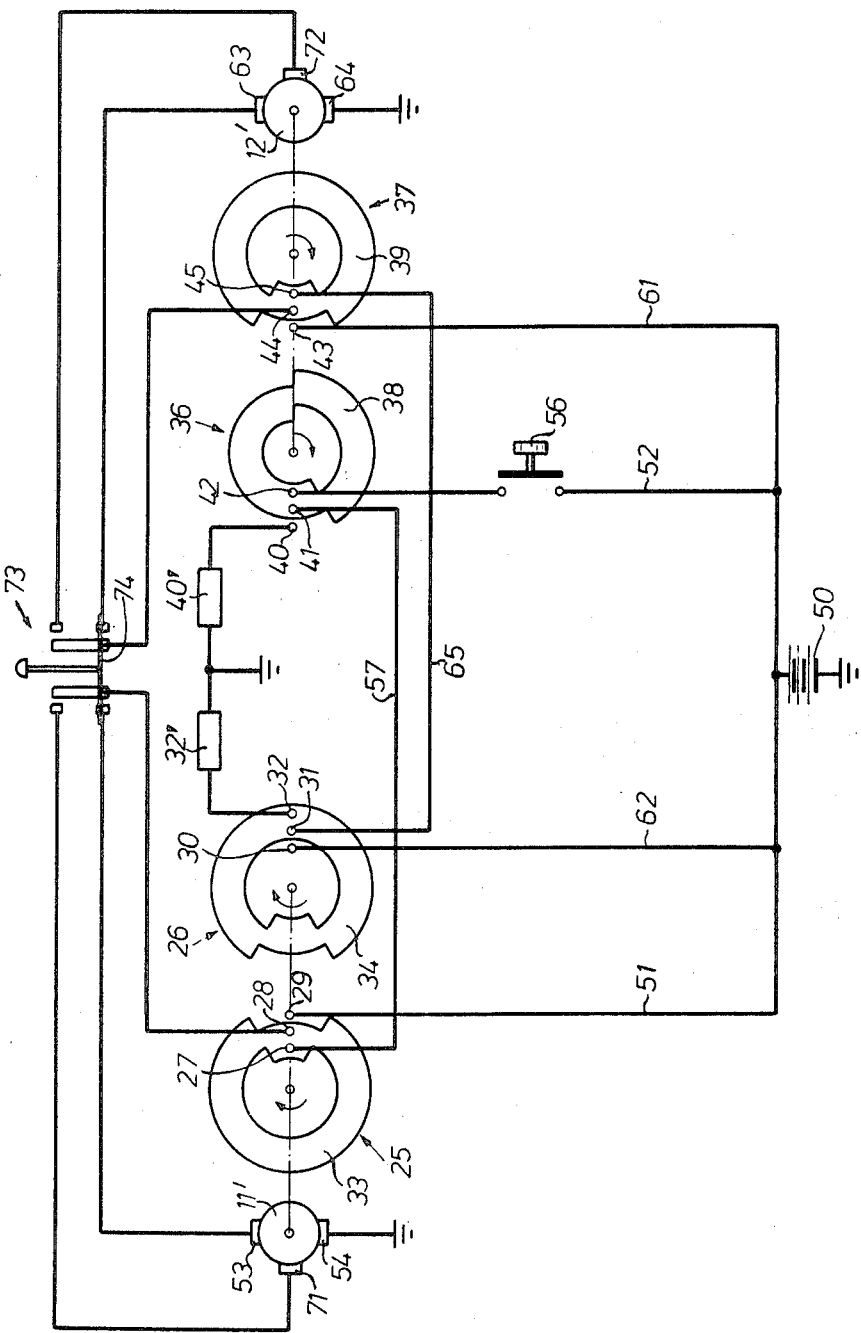
FIG. 3 illustrates, in a view similar to FIG. 2, an electrical circuit to be used in an embodiment such as FIG. 1 but where the wipers are to move at more than one speed.

Discussing firstly the diagrammatic view of FIG. 1, which illustrates a windshield wiper arrangement with which either the circuit of FIG. 2 or that of FIG. 3 may be utilized, it will be seen that the windshield per se is designated with reference numeral 10. Two electrical motors 11 and 12 are provided, which drive the windshield wipers 17 and 18, respectively. The motor 10 is connected with a crank 13 which it rotates, and the crank 13 in turn is connected with a linkage rod 14 which imparts motion to a rocker arm 15, to thereby impart an oscillatory movement to a shaft 16 which is tunnably channeled in an appropriate bushing mounted in a non-illustrated body member of the vehicle of which the windshield 10 forms a part. The same arrangement applies to the motor 12, where the same components are provided and driven in the same way as just described.

The two shafts 16 which are thus provided each have mounted on them one of the wipers 17 and 18, respectively. The wipers 17 and 18 in turn each have a wiper blade 19 and 20.

In FIG. 1 the wipers 17 and 18, and thus of course also their blades 19 and 20, have been illustrated in their starting positions which are designated with reference numerals 19' and 20', respectively. Of course, it will be appreciated that these starting positions are also the outer direction-reversing positions to which the blades 19 and 20 will return when the wiper arrangement is in operation. From these positions 19' and 20' the blades 19 and 20 move, when the arrangement is in operation, to the inner direction — reversing positions 19'' and 20'', respectively. The wiping fields which are wiped by the respective blades 19 and 20 are illustrated in chain lines and designated with reference numerals 21 and 22, respectively. It will be seen that in the middle of the windshield 10 the fields 21 and 22 overlap in a region 23. It will be further appreciated that if the movement of the blades 19 and 20 from their positions 19' and 20' to their positions 19'' and 20'' where to be initiated simultaneously on energization of the wiper arrangement, the blades 19 and 20 would contact one another in the area 23 and would, if not sustaining any damage, at least prevent each other from further operation.

This is avoided, in accordance with the present invention, in that the motors 11 and 12 are so electrically switched that on energization of the arrangement the wiper 17 will first move by itself (the wiper 18 remains in its position 20') to the direction-reversing position 19''. When the wiper 17 has reached the direction-reversing position 19'' and begins to move towards its staring position 19', the wiper 18 begins to move with it in synchronism towards its own reversing position 20''. The two wipers thus now move in unison and in one and the same direction, rather then in mutually opposite directions.

When the arrangement is to be de-energized the wiper 17 is first stopped when it reaches its starting position 19', at that time the wiper 18 is in its direction-reversing position 20''. With the wiper 17 now remaining in the starting position 19' thereof, the wiper 18 moves by itself from its direction-reversing position 20'' to its starting position 21. When it has reached the position 21, it remains there and the arrangement is now de-energized with the wipers 17 and 18 being in their respective starting positions in which they extend away from one another. Of course, in the starting position the blades 19 and 20 of the wipers 17 and 18 are located at or near the lower edge of the windshield 10 so as not to interfere with the sight of a vehicle operator. In operation, on the other hand, one of the wipers will always be at or closely adjacent and moving to its starting position at the time the other wiper wipes the area 23. In the operation of the arrangement the wipers 19 and 20 are always arranged essentially in parallelism with the flow of impinging air, so that the danger that the wiper blades 19 and 20 might be lifted off the windshield by the air flow at high speed, is largely eliminated.

As already pointed out above, the arrangement in FIG. 1 can utilize the circuit of FIG. 2 or that of FIG. 3. Discussing firstly, in FIG. 2 it is pointed out that the motors 11 and 12 are both constructed as permanently excited direct-current motors which each are combined with a step-down drive in a single structural unit. The cranks 13 are mounted on the outward shaft of this unit.

In the embodiment of FIG. 2 there are mounted two rotary cam discs 25 and 26 of electrically insulating material in the housing of the motor 11, turning with the output shaft at the same angular velocity as the crank 13. The cams 25 and 26 each have a circular electrically conductive (for instance, metallic) cam track 33 and 34, respectively. The three wiping contacts 27, 28 and 29 engage the track 33 of the cam 25, and three similar wiping contacts 30, 31 and 32 engage the track 34 of the cam 26. The direction of rotation of the cams 25 and 26 is indicated by the arrows in FIG. 2.

Two further rotary cam discs are mounted in the housing of the motor 12, being identified with reference numerals 36 and 37 and likewise turning with the output shaft of the motor 12 at the same angular velocity as the crank 13 driven thereby. Again, the cams 36 and 37 are provided with electrically conductive cam tracks 38 and 39, respectively. Three wiping contacts 40, 41 and 42 engage the cam track 38 and three similar wiping contacts 43, 44 and 45 engage the cam track 39. The various sets of cam tracks associated with the cams 25, 26, 36 and 37 are electrically connected and disconnected via their respectively associated cam tracks in certain angular positions of their respective cams, as will be discussed later.

Reference numeral 50 identifies a source of electrical energy, here the battery of a motor vehicle in which the arrangement is provided. Motor 11 is connected with one pole of the battery 50 via circuits or conductors 51 and 52. The conductor 51 is provided with the wiping contact 29 and associated intermediate the battery 50 and the motor 11 only with the cam disc 25. The conductor 52 is associated with both of the cam discs 36 and 25.

Sliding contact 28 of the cam disc 25 is permanently electrically connected with one of the brushes 53 of the motor 11, and the contacts 28 and 29 constitute, together with the track 33, a switch in the conductor 51 which serves to interrupt the supply of electrical energy to the motor via the conductor 51 whenever the wiper 17 driven by the motor 11 is in the starting position, that is the position identified in FIG. 1 with reference numeral 19'. However, as soon as the wiper 17 moves out of the position 19', the contacts 28 and 29 are connected electrically via the track 33, so that the motor 11 is supplied with electrical energy via the conductor 51 during an entire wiping cycle of the wiper 17, that is during the movement of the wiper 17 from the position 19' to the position 19'' and back to the position of 19'. The motor 11 is additionally connected with the second pole of the battery 50, that is it is the brush 54 of the motor 11 which is so connected via a mass.

The arrangement must be capable of being energized and de-energized at the will of an operator. For this purpose, an operator-controlled switch 56 is interposed in the conductor 52 of the motor 11, which conductor 52 is connected with the wiping contact 42 of the cam disc 36. The sliding contact 41 of the disc 36 is connected via a conductor 57 with the sliding contact 27 of the cam disc 25. The third sliding contact of the cam disc 36, namely that one identified with reference numeral 40, is connected via mass with the second pole of the battery 50.

As indicated in FIG. 2, a pair of limitors 32' and 40' are interposed between mass and the contacts 32 and 40, respectively; their purpose is to limit the generator current to a predetermined value upon braking.

Reference to FIG. 2 will show that the cam track 38 of the cam disc 36 is so configurated so that upon rotation of the disc and when the wiper 18 is in its starting position 20', the wiping contacts 41 and 42 are electrically connected with one another whereas the wiping contacts 40 and 41 are electrically disconnected from one another. As soon as the wiper 18 moves out of its starting position 20' and towards its direction-reversing position 20'', the electrical connection between the contacts 41 and 42 is interrupted and an electrical connection is established between the contacts 40 and 41, due to the configuration of the track 38. After the cam disc 38 has performed half a turn, that is at the time when the wiper 18 has reached its direction-reversing position 20''., the contacts 41 and 42 are again electrically connected with one another via the track 38 and at the same time the contacts 40 and 41 are electrically disconnected.

As seen by inspection of the cam disc 25, contact 27 is electrically connected with contact 28 via the track 33 as long as the wiper 17 is in the starting position 19' thereof. As soon as the wiper 17 moves out of its starting position 19, the contacts 27 and 28 are electrically disconnected from one another and remain so while the wiper 17 is out of the position 19'. The cam discs 25 and 26, together with their cam tracks and contacts, constitute transfer switches whose contacts 28 and 41 — which are continuously in electrical contact with the tracks 33 and 38, respectively — are alternately electrically connected with one of the two other wiping contacts of the respective cam discs 25 and 36.

In a manner analagous to what has just been described with respect to the motor 11, the motor 12 is connected with one pole of the battery 50 via two circuits or conductors 61 and 62. The conductor 61 extends up to the sliding contact 43 of the cam disc 37, whose sliding contact 44 is continuOusly in electrical engagement with the cam track 39 and is connected with the brush 63 of the motor 12. The other brush of the motor 12, identified with reference numeral 64, is connected via mass with the second pole of the battery 50.

The cam disc 37 has still a third sliding contact 45, as previously pointed out, and this is connected via a conductor 65 with the middle contact 31 of the cam disc 26. The contact 30 of the cam disc 36 is connected with one pole and the contact 32 via mass with the other pole of the battery 50. The cam discs 26 and 37 also constitute, together with their respective cam tracks and contacts, transfer switches whose middle contacts 31 and 44 are alternately connected with one of the respectively adjacent two other contacts. It must be noted, however, that the cam track 34 of the cam disc 26 has a different configuration than the cam track 38 of the disc 36, in order to achieve the desired operation which will be described hereafter.

When the arrangement shown in FIG. 1 and as electrically connected according to FIG. 2, is in its non-operative condition, the wipers 17 and 18 assume the starting positions 19' and 20' shown in FIG. 1. In these positions the switches interrupt the supply of electrical energy to the motors 11 and 12, whereas the cam track 25 connects the brush 53 of motor 11 via conductor 57 with the cam disc 36. The latter connects the conductor 57 via mass to the second brush 54 of the motor 11. This constitutes a braking circuit for motor 11 which assures that when the motor reaches the starting position — and assuming that the wiper arrangement has previously been shut off — the motor will rapidly come to a stop.

In similar manner, as just described, the cam discs 37 and 26 interrupt the supply of electrical energy to the motor 12 and provide a braking circuit for the same when the wiper 18 is in its starting position 20'.

If, now, the wiper arrangement is to be operated, the switch 56 is closed by the user. Motor 11 is now supplied with electrical energy via contacts 42 and 41, conductor 57 and contacts 27 and 28. It begins to turn and moves the wiper 17 out of the starting position 19' towards the direction-reversing position 19''. At the same time the cam discs 25 and 26 rotate in the direction indicated by the arrows, being moved by the operation of the motor 11, and the disc 25 establishes an electrical connection of motor 11 with the battery 50 via the conductor 51, which connection remains established independently of the operation of the switch 56 and of the position of any of the other components of the circuit, until the wiper 17 has completed a full wiping cycle and has returned from the direction-reversing position 19' to the starting position 19'.

As mentioned earlier, it is important that the starting of movement of wiper 18 be delayed with respect to that of the wiper 17. Therefore, during the first half turn or revolution of the discs 25 and 26 the motor 12 remains de-energized, because of the configuration of the track 34. Thus, the wiper 18 remains without movement in its starting position 20' while the wiper 17 moves from the starting position 19' to the direction-reversing position 19''. When the wiper 17 has reached the position 19'' the disc 26 will have performed a rotation of 180°; at this time the connection of contact 31 with contact 32 is interrupted, at the same time electrical connection is established between contacts 30 and 31. This makes a circuit which extends from battery 50 via the conductors 62 and 65, the contacts 45 and 44 and the motor 12 and back to the battery 50. In other words, the motor 12 is now energized, beginning to turn and moving the wiper 18 from the starting position 20' toward the direction-reversing position 20'' thereof. Shortly after the wiper 18 moves out of the starting position 20', a current-supplying connection is established for the motor 12 via the conductor 61 and the contacts 43 and 44, independently of the position of the other components. This connection remains established until the wiper 18 has completed a full wiping cycle and returns from the direction-reversing position to the starting position 20'.

At this point in time, both wipers 17 and 18 are moving. More particularly, the wipers 17 and 18 now move in unison and in one and the same direction because at the time the wiper 18 begins to move towards the left from its starting position 20' towards its direction-reversing position 20'', the wiper 17 also moves from its own direction-reversing position 19'' towards its starting position 19'. When the wipers 17 and 18 reach the position 19' and 20'', respectively, the cam discs 25 and 26 actuated by the motor 11 will have turned a full 360°, whereas the cam discs 36 and 37 actuated by the motor 12 will have turned through 180°, always as seen with respect to the illustrated position in FIG. 2. The disc 25 now disconnects the brush 53 of motor 11 from the conductor 51, and connects it via conductor 57 with the contact 41 of the disc 36 which latter, due to the 180 degree revolution, has re-established the original electrical connection of the contacts 41 and 42 with one another. The interruption of the electrical connection between the contacts 28 and 29 of the disc 25 is thus bridged and the motor 11 receives current temporarily via the switch 56, the disc 36, the conductor 57 and the contacts 27 and 28, until such time as the disc 25 again transfers connection of the motor 11 to the conductor 51. Then, wiper 17 again moves through a complete wiping cycle until it again reaches its starting position 19' and its motor 11 is again energized with electrical current via the disc 36.

If, as may occur, the motor 11 rotates faster than the motor 12 (and thus the wiper 17 moves faster than the wiper 18), the wiper 17 is briefly retained in its starting position 19' via operation of the disc 36 until the wiper 18 can catch up, that is until the wiper 18 reaches its direction-reversing position 20″. This is achieved in that, should the wiper 17 reach its position 19′ before the wiper 18 reaches its position 20″, the contact 41 will still be electrically connected with the contact 40 and electrcially disconnected from the contact 42 at the time when the disc 25 transfers connection of motor 11 from conductor 51 to conductor 57 and contact 41. This transfer connects the brush 53 of motor 11 via the disc 25, conductor 57, disc 36 and mass with the second brush 54 of the motor 11, so that the motor 11 is braked rapidly and is stopped. When the wiper 18 has caught up, that is when it subsequently reaches the position 20″, the disc 36 transfers connection of the brush 53 of the motor 11 to the battery 50 so that the motor 11 is again energized and both wipers continue to move in one and the same direction and in unison.

When subsequently the wiper 17 reaches its direction-reversing position 19″, the motor 12 reaches a current pulse via the disc 26, which bridges the previously interruption of the first circuit or conductor 61 of the motor 12 by the disc 37, and the wiper 18 can now carry out its next wiping cycle. In this manner the wipers 17 and 18 continue to move in synchronizm to and fro until the switch 56 is opened by an operator, initiating the return of the wipers to their respective starting positions. The disc 26 assures similar to the operation of the disc 36 with respect to the motor 11, that the motor 12 is temporarily stopped if it should be the motor 12 that turns faster than the motor 11 and if, therefore, the wiper 18 which is pivotably moved by it should reach one of its end positions before the opposite end position is reached by the wiper 17. motor 11 continues to receive electrical current via the conductor 51 until it has turned to such an extent that its associated wiper 17 has reached the starting position 19′ thereof. In this position the disc 25 transfers connection of the motor 11 from the conductor 51 to the conductor 57. However, due to the interruption of the circuit of conductor 52 by opening of the switch 56, the supply of electrical current which in operation of the arrangement flows to the motor 11 via the disc 36 and to the conductor 57, is now missing and the motor 11 is deenergized. At this time, the motor 12 continues to operate until the wiper 18 has returned to its starting position 20′ and until at such time the supply of electrical energy to the motor 12 is interrupted via the dish 37 and the conductor 61. At that time the disc 37 establishes a connection of the motor 12 via the conductor 65 with the contact 31 of the disc 26, the conductor 31 being connected via the track 34 and the contact 32 with mass. This results in rapid braking of the motor 12 so that the wiper 18 is now retained in its starting position 20′.

The operation of the circuit not illustrated in FIG. 3 is analogous to what has been set forth above. The FIG. 3 arrangement is particularly advantageous when the novel wiper arrangement is to be employed in an installation in which the wipers can operate not only at a first wiping speed but at a higher second wiping speed.

This is shown in FIG. 3 wherein like components are identified with like reference numerals as in FIG. 2. In FIG. 3, however, the motors 11′ and 12′ are additionally provided with a third brush 71 and 72, respectively. A step switch 73 is provided which permits selection of the desired lower or higher wiping speed; it has a movable member 74 which, depending upon the position selected for it, connects the contacts 28 and 44 of the disks 25 and 27 with the brushes 53 and 63, or else with the additional brushes 71 and 72, respectively.

When the arrangement is switched as illustrated in FIG. 3, that is when the step switch 73 has the illustrated position, the motors 11′ and 12′ will operate at normal speed, that is at the lower wiping speed. When the member 74 of the switch 73 has moved to the upper position out of the position illustrated in FIG. 3, the motors receive current via the additional brushes 71 and 72, respectively, thus causing the motors 11′ and 12′ to rotate faster and to provide a higher second wiping speed for the wipers.

In all other respects the arrangement of FIG. 3 is the same as in FIG. 2, and its operation is also the same.

It will be understood that each of the elements described above, or two or more together, may also find a useful application in other types of construction differing from the types described above.

While the invention has been illustrated and described as embodied in a windshield wiper arrangement, it is not intended to be limited to the details shown, since various modifications and structural changes may be made without departing in constitute way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims:

1. In a windshield wiper arrangement, particularly for motor vehicles, in combination, first and second wiper means mounted for pivotal displacement between a respective starting position and a direction-reversing position; a source of electrical energy; a first and a second motor each connected with one pole of said source; first and second circuit means connecting said first motor with the other pole of said source; third and normally open fourth circuit means connecting said second motor with said other pole of said source; first control switch means interposed in said first and third circuit means and responsive to pivotal displacement of said first wiper means for making and breaking said first and third circuit means while said first wiper means is respectively out of and in said starting position; an operator-controlled switch interposed in said second circuit means for making and breaking the latter at the will of an operator; and second control switch means interposed in said fourth circuit means and associated with said first wiper means, being responsive to pivotal displacement of the same and operative for making said fourth circuit means while said first wiper means is in said direction-reversing position thereof.

2. In a windshield wiper arrangement as defined in claim 1; further comprising interruptor switch means interposed in said second circuit means in series with said operatordcontrolled switch and operatively associated with said second wiper means, said interruptor switch means being operative for temporarily interrupting said second circuit means during displacement of said second wiper means towards but prior to reaching of said direction-reversing position thereof.

3. In a windshield wiper arrangement as defined in claim 2, said first control switch means comprising a pair of first transfer switches for alternately transferring electrical connection of said first motor between said first and second circuit means, and of said second motor between said third and fourth circuit means; and wherein said second control switch means and said interruptor switch means comprise second transfer switches each having a transfer contact connected with one of said first transfer switches, and another contact connected with said other pole of said source of electrical energy.

4. In a windshield wiper arrangement as defined in claim 3; and further comprising step-switch means for selecting at least two different speeds of pivotal displacement for said wiper means, and being operatively associated with said first and second motors.

5. In a windshield wiper arrangement as defined in claim 4, said step-switch means comprising a single step switch interposed in said first and third circuit means intermediate said motors and said first transfer switches.

* * * * *